(12) United States Patent
Huang et al.

(10) Patent No.: US 11,314,912 B2
(45) Date of Patent: Apr. 26, 2022

(54) IC DESIGN DATA BASE GENERATING METHOD, IC DESIGN METHOD, AND ELECTRONIC DEVICE USING THE METHODS

(71) Applicant: Realtek Semiconductor Corp., HsinChu (TW)

(72) Inventors: Szu-Ying Huang, Hsinchu County (TW); Mei-Li Yu, Hsinchu (TW); Yu-Lan Lo, Hsinchu County (TW); Shu-Yi Kao, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/862,575

(22) Filed: Apr. 30, 2020

(65) Prior Publication Data

US 2020/0356716 A1     Nov. 12, 2020

(30) Foreign Application Priority Data

May 7, 2019   (TW) ................... 108115648

(51) Int. Cl.
   *G06F 30/30*   (2020.01)
   *G06F 30/337*   (2020.01)
   *G06F 30/327*   (2020.01)
   *G06F 119/06*   (2020.01)
   *G06F 119/08*   (2020.01)

(52) U.S. Cl.
   CPC .......... *G06F 30/337* (2020.01); *G06F 30/327* (2020.01); *G06F 2119/06* (2020.01); *G06F 2119/08* (2020.01)

(58) Field of Classification Search
   CPC .. G06F 30/337; G06F 30/327; G06F 2119/06; G06F 2119/08; G06F 2119/12; G06F 30/3312; G06F 30/392
   See application file for complete search history.

(56) References Cited

U.S. PATENT DOCUMENTS

| | | | | |
|---|---|---|---|---|
| 6,591,407 B1* | 7/2003 | Kaufman | ................ | G06F 30/39 716/114 |
| 7,325,215 B2* | 1/2008 | Dinter | ................... | G06F 30/392 716/114 |
| 8,180,621 B2* | 5/2012 | Phillips | ................. | G06F 30/367 703/14 |
| 8,413,095 B1* | 4/2013 | Dubuque | ............ | G06F 30/3323 716/113 |
| 2013/0227510 A1 | 8/2013 | Katz | | |
| 2017/0031376 A1 | 2/2017 | Coutts | | |

* cited by examiner

*Primary Examiner* — Jack Chiang
*Assistant Examiner* — Brandon Bowers
(74) *Attorney, Agent, or Firm* — Winston Hsu (57) ABSTRACT

An IC design data base generating method, including: receiving a condition parameter, which comprises a process parameter and an operating parameter range comprising at least one operating parameter; and testing at least one cell according to the process parameter and the operating parameter range to generate a delay value data base. The delay value data base comprises a plurality of delay values, wherein the plurality of delay values for an identical cell correspond to the operating parameter range with an identical type but different value. An IC design method using the delay value data base is also disclosed.

16 Claims, 6 Drawing Sheets

| Condition parameter | Content |
|---|---|
| Operating voltage range | 0.6*VDD~VDD |
| Sampling voltage | 10mv |
| Data quantization parameter | MAX (Rise, Fall) |

| | tt_85C | FFG_m40C | SSG_m40C |
|---|---|---|---|
| Test voltage range | 0.9V→0.89V | 0.99V→0.89V | 0.81V→0.8V |
| Second filtering parameter | 1.25p sec | 1.1p sec | 3.55p sec |
| Cell number proportion after filtered | 11/974 (1.13%) | 11/974 (1.13%) | 26/974 (2.67%) |

FIG. 6

| Common cell | CB1<br>TT/0.9V/85°C | CB2<br>FFG/0.99V/-40°C | CB3<br>SSG/0.81V/-40°C |
|---|---|---|---|
| C2 | C1 | C2 | C1 |
| C3 | C2 | C3 | C2 |
| C4 | C3 | C4 | C3 |
|    | C4 | C7 | C4 |
|    |    | C8 | C5 |
|    |    |    | C6 |
|    |    |    | C10 |
|    |    |    | C11 |

IC DESIGN DATA BASE GENERATING METHOD, IC DESIGN METHOD, AND ELECTRONIC DEVICE USING THE METHODS

BACKGROUND OF THE INVENTION

1. Field of the Invention

The present invention relates to an IC design data base generating method, an IC design method and an electronic device using the methods, and particularly relates to an IC design data base generating method and an IC design method which can provide cell delay value information and an electronic device using the methods.

2. Description of the Prior Art

The conventional IC (Integrated Circuit) design flow needs a long time to complete the entire process. However, the delay value of the cell in the IC to the signal may have different values in different situations, but the database used in the existing IC design flow only records the delay information of each cell under a specific application condition, thus have limited delay value information. Such limited delay value information is not enough for the calculation of desired parameter variation results in the design process. Therefore, the IC only can be tested to determine whether the delay value of the cell in a voltage range meets the required range after the IC has been produced. If the IC cell produced finally does not meet the requirements, the IC must be redesigned, that is, all design processes must be re-executed, which is a considerable burden for the relevant staff.

SUMMARY OF THE INVENTION

Therefore, one objective of the present invention is to provide an IC design data base generating method which can generate a delay value data base having sufficient delay value information.

Another objective of the present invention is to provide an IC design method which can design an IC referring to a delay value data base having sufficient delay value information.

One embodiment of the present invention discloses an IC design data base generating method, comprising: receiving a condition parameter, which comprises a process parameter and an operating parameter range comprising at least one operating parameter; and testing at least one cell according to the process parameter and the operating parameter range to generate a delay value data base. The delay value data base comprises a plurality of delay values, wherein the plurality of delay values for an identical cell correspond to the operating parameter range with an identical type but different value.

Still another embodiment of the present invention discloses an IC design method, comprising: (a) receiving a first filtering parameter; and (b) acquiring cell delay value information matching the first filtering parameter from a delay value data base according to the first filtering parameter, wherein the delay value data base comprises a plurality of delay values, wherein the plurality of delay values for an identical cell correspond to an operating parameter range with an identical type but different values.

In view of above-mentioned embodiments, the present invention can generate a delay value database having cell delay value information in an operating parameter range, and an IC design method performed according to the delay value database. By this way, the conventional issue that a data base only contains cell delay value information corresponding to a single operating parameter thus the cell delay value in an operating parameter range must be measured after the IC has been produced can be improved. In addition, it should be understood that the steps of method mentioned in the present embodiment can be adjusted according to actual needs, and can be performed simultaneously or partially simultaneously, unless the order is specifically described.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, a plurality of embodiments are provided to explain the concept of the present invention. Please note, each of following embodiments can be implemented by hardware (e.g. circuit or device), and can be implemented by firmware (e.g. a processor installed with at least one program).

Figure 1:
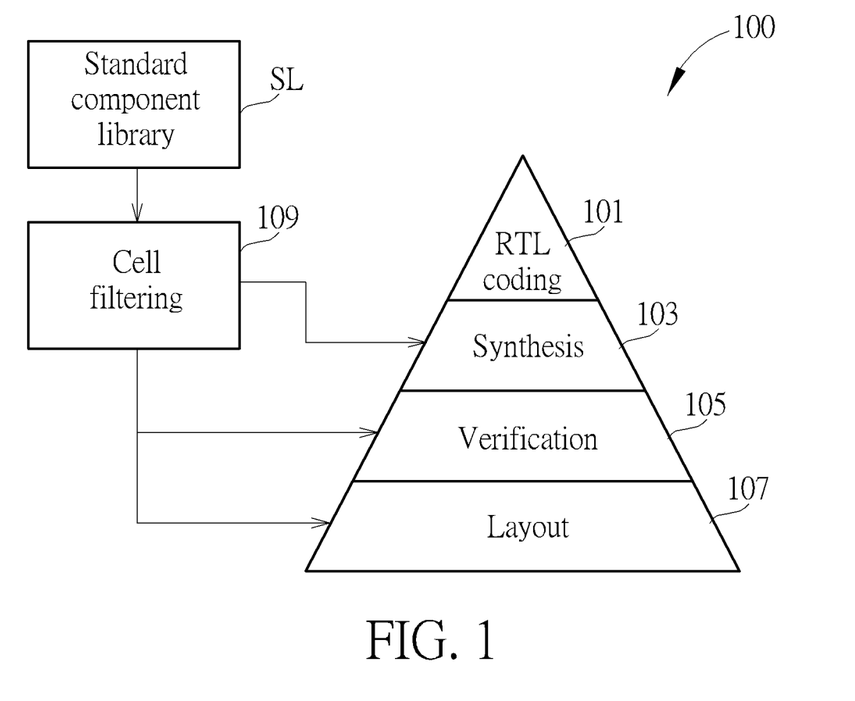
FIG. 1 is a schematic diagram illustrating an IC design flow according to one embodiment of the present invention.

FIG. 1 is a schematic diagram illustrating an IC design flow according to one embodiment of the present invention. As shown in FIG. 1, the IC design flow 100 comprises steps of RTL coding 101, synthesis 103, verification 105 (e.g. static timing analysis, STA), and layout 107. In RTL coding 101, the module function is described by codes by hardware description languages such as VHDL, Verilog). That is, the actual hardware circuit function is described by HDL languages to form RTL (register-transfer level) codes. In synthesis 103, the RTL codes are converted to a file format describing the circuit (e.g. netlist). In verification 105, the timing or function of the circuit is verified. Also, the layout 107 represents subsequent layout planning, actual winding or engineering change order (ECO), and the like.

In the conventional IC design flow, a user selects components in the standard cell library SL to generate a file format describing the circuit before synthesizing 103. However, the standard component library SL does not contain information for delay values in various kinds of situations for each cell. That is, the standard component library only provides information under specific voltages which cannot fulfill the requirement from the user. Therefore, the issue that the delay value (or delay time) of the cell does not meet the requirements is always known when the produced IC is measured after the layout 107, thereby causing the aforementioned problem that the IC design flow must be re-executed.

Therefore, the present invention first generates a delay value database, which comprises the relations between the delay values of a plurality of cells and the operating parameters, and further provides another cell filtering step 109 before the synthesis 103 is performed according to the delay value database. The cells are filtered thereby the designer can avoid using a cell with a delay value that does not meet the requirements. This avoids the problem that the IC design flow needs to be re-executed in the prior art.

However, please note, the IC design flow is not limited to the steps of RTL coding 101, synthesis 103, verification 105 (e.g. STA), and layout 107 in FIG. 1. The IC design flow may have different steps corresponding to different designs. Additionally, the cell filtering 109 is not limited to be executed before the synthesis 103. Any IC design flow which filters cells according to the data value data base should fall in the scope of the present invention.

Figure 2:
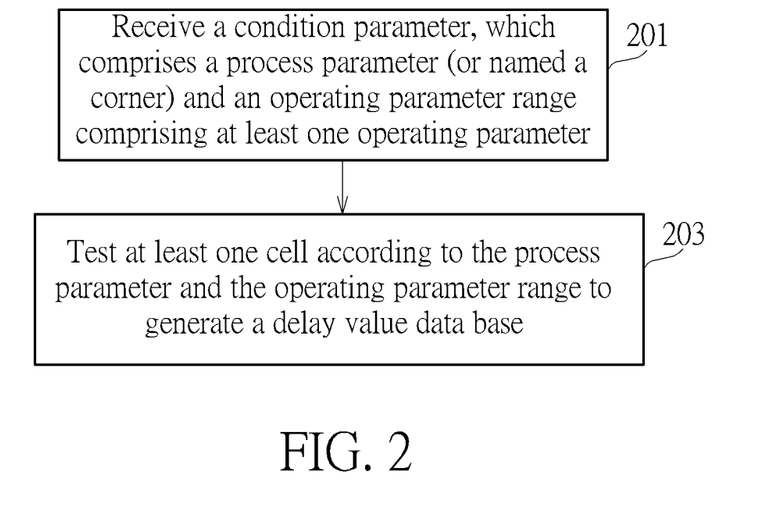
FIG. 2 is a flow chart illustrating an IC design data base generating method according to one embodiment of the present invention.

FIG. 2 is a flow chart illustrating an IC design data base generating method according to one embodiment of the present invention, which generates the above-mentioned delay value data base and comprises following steps:

Step 201

Receive a condition parameter, which comprises a process parameter (or named a corner) and an operating parameter range comprising at least one operating parameter.

The operating parameter can comprise at least one of following parameters: a loading parameter, an input slew rate, an operating frequency, a temperature and a voltage. For example, the user can input the voltage to be analyzed as 0.7 v-1.1 v, and input the temperature as −40° C. The above-mentioned TT, FF, SS, FS, or SF can be regarded as parameters representing the corresponding location information of the cell on a wafer. A speed of the cell varies depending on its location on the wafer. TT, FF, SS, FS, SF are used to define the switching speed of NMOS and PMOS. S, T, and F respectively represent slow, typical and fast. TT indicates that the switching speed of NMOS is T, and the switching speed of PMOS is T. FS indicates that the switching speed of NMOS is F, and the switching speed of PMOS is S . . . and so on. In addition, SSG/FFG are also different kinds of process parameters. The characteristics of SSG (SS global) are slightly closer to TT than SS; the characteristics of FFG (FF global) are slightly closer to TT than FF. Please note that the various process parameters described above are for examples only. The method provide by the present invention can be applied to all process parameters.

In one embodiment, the condition parameters comprise which cells will be tested. For example, it may be specified to test which specific types of cells, such as testing a cell used as a delay stage or testing a cell used as an adder. If not specified, all cells in the standard component library SL will be tested.

Step 203

Test at least one cell according to the process parameter and the operating parameter range to generate a delay value data base. The delay value data base comprises a plurality of delay values, wherein the plurality of delay values mean delays for an identical cell correspond to the operating parameter range with an identical type but different values.

For example, the delay value data base comprises a delay value of the cell which has a process parameter TT, an operating voltage 0.9 v and operates as a delay stage, and also comprises a delay value of the cell which has a process parameter TT, an operating voltage 1.1 v and operates as a delay stage.

In one embodiment, the step 203 generates the files required by the simulation software (for example, HSPICE, Fine Sim, and Spectre) according to the condition parameters received in the step 201, and then performing tests via the simulation software. The above-mentioned condition parameters can be inputted via a variety of interfaces, for example, can be inputted via a program form, or a window type interface which can allow a user to select condition parameters. The various parameters in following embodiments can also be inputted in such a manner.

Figure 3:
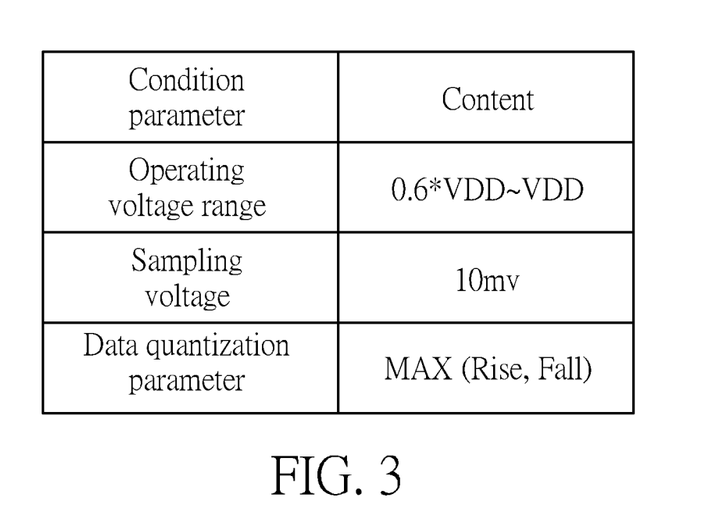
FIG. 3 is a schematic diagram illustrating one example of the operating parameter range illustrated in FIG. 2.

FIG. 3 is a schematic diagram illustrating one example of the operating parameter range illustrated in FIG. 2. As illustrated in FIG. 3, the operating voltage range (i.e. the above-mentioned operating parameter range) is 0.6 VDD-VDD. The VDD means a maximum operating voltage of the IC. However, the operating voltage range can be specific voltages, such as 0.7 v-1.1 v.

In addition to the operating parameter range, the condition parameter may further comprise other auxiliary parameters. For example, as shown in FIG. 3, the condition parameter further comprises a sampling voltage, which determines a voltage difference between different times of test. In addition, the condition parameter can further comprise data quantization parameters to reduce the total amount of data. In the example of FIG. 3, the data quantization parameter is MAX (Rise, Fall), which indicates that a maximum value of the delay value of a rising edge of a test signal and the delay value of a falling edge of the same test signal is taken as the delay value of the cell. Neither the delay value or the rising edge or the delay value of the falling edge can represent the delay value of the cell. However, if both the delay values of the rising edge and the delay value of the falling edge are recorded in the delay value database, a very large amount of data is generated. If the maximum value of both is recorded, the amount of data can reduced by half. In one embodiment, the delay value of the rising edge and the delay value of the falling edge are both recorded in the delay value database, allowing the user to check it when necessary, or to read the required delay values to calculate other parameters (for example, the second filtering parameter in following descriptions). Please note that the auxiliary parameters are not limited to the examples given in FIG. 3.

Figure 4:
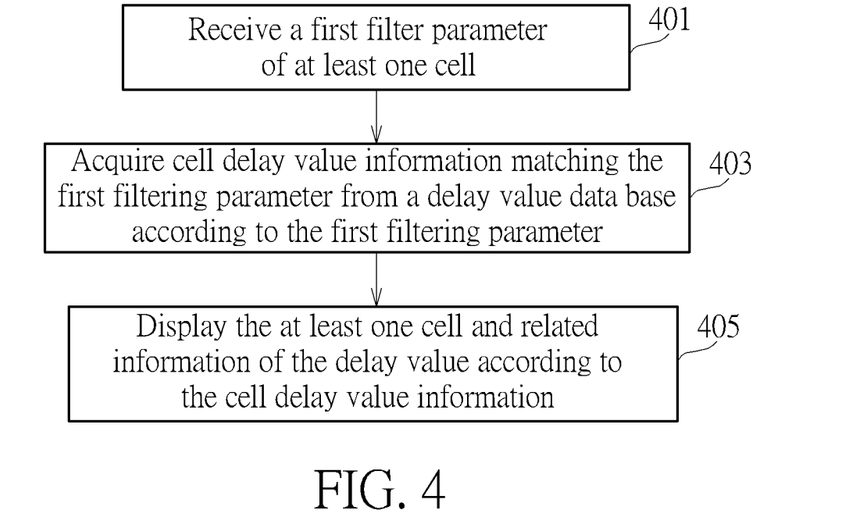
FIG. 4 is a flow chart illustrating an IC design method according to one embodiment of the present invention.

The delay value database generated according to the steps of FIG. 2 can be used in the IC design flow shown in FIG. 4. FIG. 4 is a flow chart illustrating an IC design method, which can also be regarded as the cell filtering 109 in FIG. 1, according to one embodiment of the present invention. The method in FIG. 4 comprises following steps:

Step 401

Receive a first filtering parameter of at least one cell.

In one embodiment, the first filtering parameter comprises at least one specific process parameter and a specific operating parameter range. Alternatively, the first filtering parameter may also comprise a variation ratio of the delay values of the cells in a range of the first filtering parameter, or a variation difference of the delay values of the cells in the range of the first filtering parameter. Detail descriptions will be described in following descriptions.

Step 403

Acquire cell delay value information matching the first filtering parameter from a delay value data base according to the first filtering parameter In one embodiment, the delay value database can be above-mentioned delay value data base generated in FIG. 2, which comprises a plurality of delay values, wherein the plurality of delay values for an identical cell correspond to an operating parameter range with an identical type but different values. For example, the delay value data base comprises a delay value of the cell which has a process parameter TT, an operating voltage 0.9 v and operates as a delay stage, and also comprises a delay value of the cell which has a process parameter TT, an operating voltage 1.1 v and operates as a delay stage.

Step 405

Display the at least one cell and related information of the delay value according to the cell delay value information.

Figure 5:
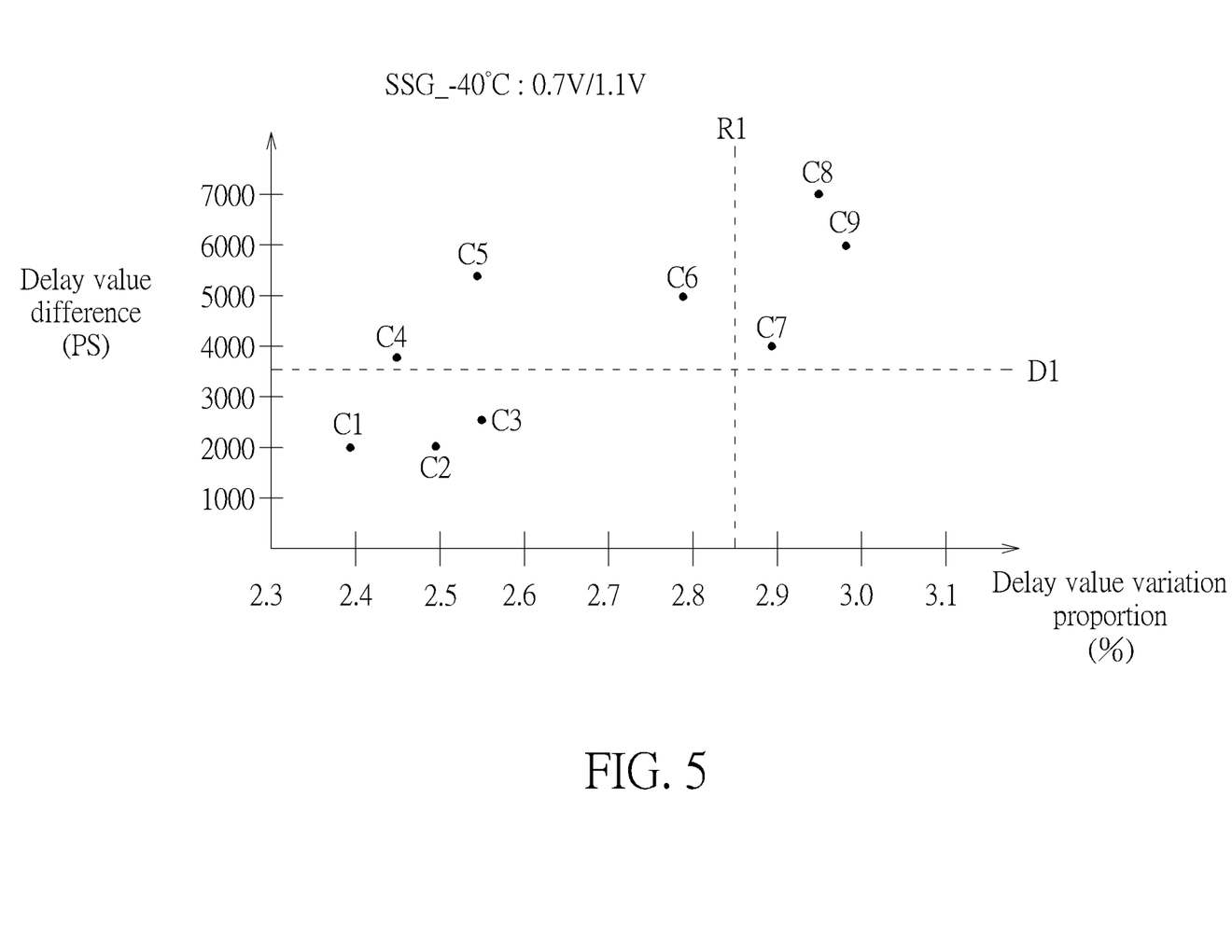
FIG. 5 is a schematic diagram illustrating one example of the step 405 in FIG. 4.

Step 405 can be presented in a variety of ways. For example, FIG. 5 is a schematic diagram showing an example of the step 405 in FIG. 4, that is, step 405 displays the content illustrated in FIG. 5. As shown in FIG. 5, the horizontal axis of the diagram is the delay value variation proportion, and the vertical axis is the delay value difference. The delay value variation proportion represents the proportion of the delay value variation of the cell at different voltages. For example, the delay value variation proportion of the delay value of the cell C2 at 0.7 v and the delay value at 1.1 v is 2.5%, and the delay value variation proportion of the delay value of the cell C6 at 0.7 v and the delay value at 1.1 v is 2.8%. Also, the delay value difference represents the variation in the delay value of the cell at different voltages. For example, the delay value difference between the delay value of the cell C2 at 0.7 v and the delay value at 1.1 v is 2000 ps (picoseconds), and the delay value difference between the delay value of the cell C6 at 0.7 v and the delay value at 1.1 v is 5000 ps. Please also note that these values are for illustrative purposes only and do not mean to limit the present invention. The cells shown in FIG. 5 can belong to the same process parameter or to different process parameters. As previously mentioned, the cells for which the process parameters or operating parameter ranges are to be displayed may be entered by the user in the step 401.

In one embodiment, the first filtering parameter comprises a delay value variation proportion or a delay value difference, and the step 405 displays a cell having a delay value variation proportion greater than or smaller than the delay value variation proportion specified by the first filtering parameter, or displays a cell having a delay value difference greater than or smaller than a delay value difference specified by the first filtering parameter. The operation of displaying the cells which is greater or smaller than the specified ones can be specified by the user. Take FIG. 5 as an example, if the delay value variation proportion specified by the first filtering parameter is R1 and the specified delay value difference is D1 and the step 405 displays a cell having a delay value variation proportion greater than R1, displays a cell having a delay value difference greater than D1, FIG. 5 only displays cells C7, C8 and C9.

In some examples, a significant number of cells may still be left after filtering through the first filtering parameters. If these cells are displayed at the same time, it may affect the clarity of displaying. Therefore, one embodiment of the present invention further filters all the cells matching the delay value information by using a second filtering parameter to generate a filtering result, and displays the cell according to the filtering result. The second filtering parameter may comprise an average delay value of all the cells matching the delay value information plus N times of a standard deviation (sigma) of delay values of all of the cells, which may be expressed as AVG+N*sigma. N can be 2, but N can also be other integers or non-integers that are predetermined values or inputted by the user. For example, the second filtering parameter can be AVG−0.1*sigma or AVG+ 2.53*sigma, and the like. The second filtering parameter can also be a value generated by other functions or a value inputted by the user.

Figure 6:
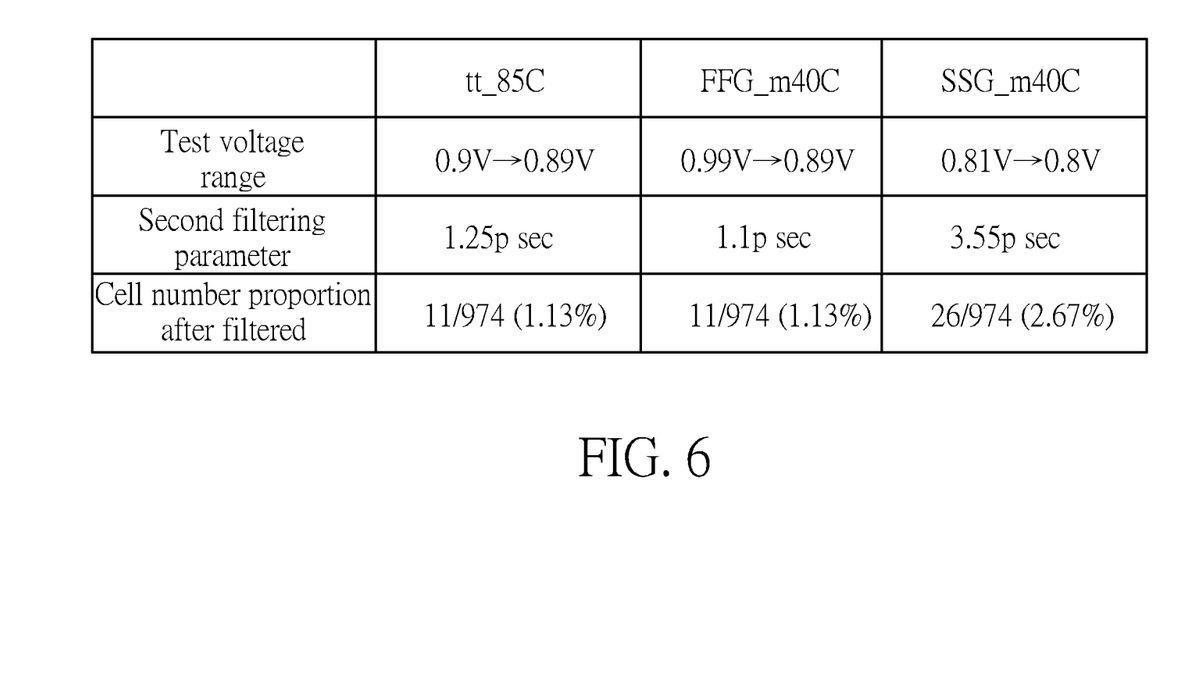
FIG. 6 is a schematic diagram illustrating an example for filtering cells according to a second filtering parameter.

In one embodiment, a cell having a delay value (or delay time) greater than the second filtering parameter is displayed, so the number of the displayed cells can be reduced. FIG. 6 is a schematic diagram illustrating an example for filtering cells according to a second filtering parameter. Note that the unit of second filtering parameter in FIG. 6 is picosecond. As shown in FIG. 6, under the combinations of different process parameters, temperatures and operating voltage ranges, the original total number of cells is 974. However, after filtering by the second filtering parameters which are respectively AVG+2*sigma in each group, under the combination of tt_85c, which means the process parameter is TT and the temperature is 85° C., only 11 cells (1.13% of the total number of cells) with a delay value greater than the second filtering parameter are left. Also, under the combination of FFG_m40c, which means the process parameter is FFG and the temperature is −40° C., only 11 cells (1.13% of the total number of cells) with a delay value greater than the second filtering parameter are left. Furthermore, under the combination of SSG_m40c, which means the process parameter is SSG and the temperature is −40° C., only 26 cells (2.67% of the total number of cells) with a delay value greater than the second filtering parameter are left. Therefore, the number of the displayed cells can be greatly reduced.

Figure 7:
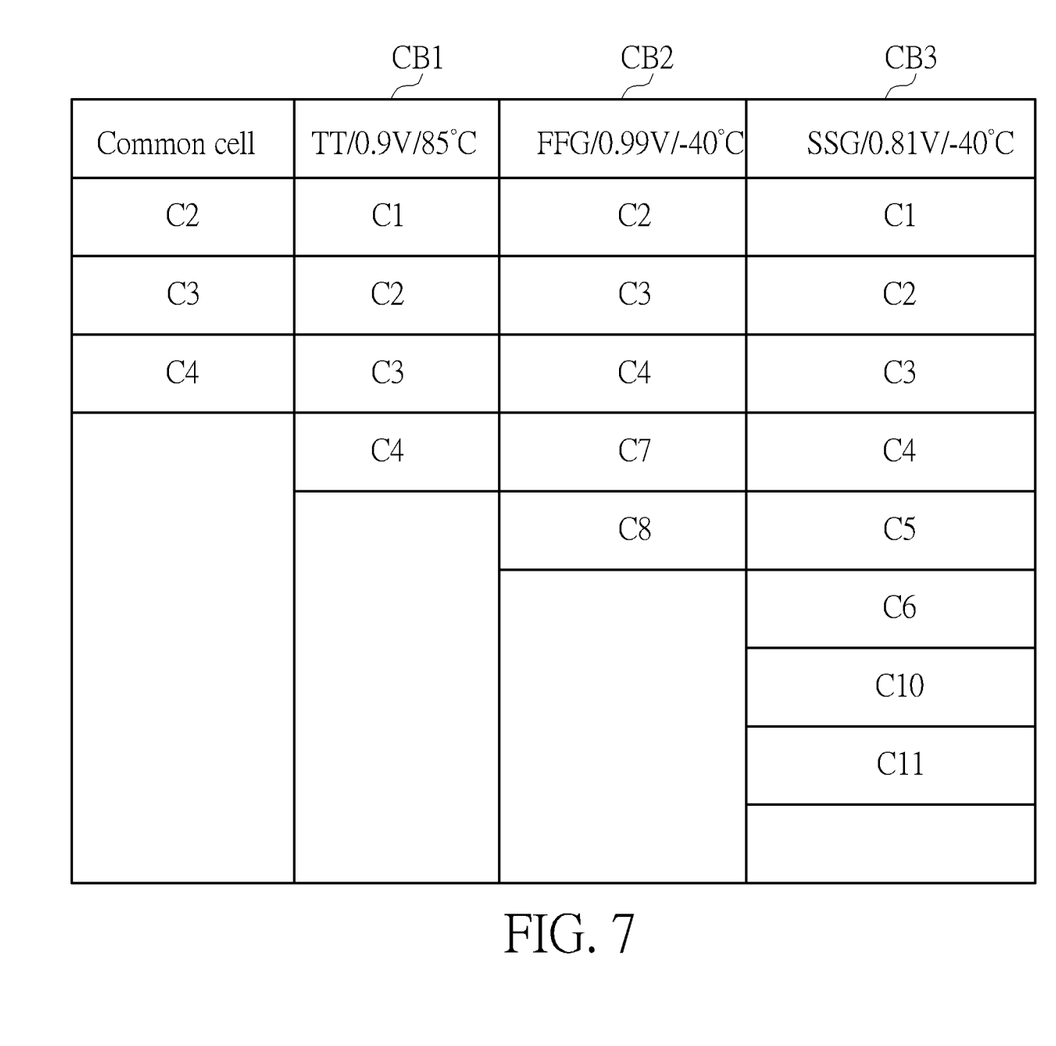
FIG. 7 is a schematic diagram illustrating an example of displaying a common cell.

In one embodiment, the cells which have delay values within a predetermined range and are under different combinations of process parameters and operating parameter ranges can be displayed. Such cells are named common cells. In other words, the cells which are shown under different process parameters (e.g. tt_85C, FFG_m40c or SSG_m40c) and filtered by the first or the second filtering parameters are named common cells. FIG. 7 is a schematic diagram illustrating an example of displaying a common cell. As shown in FIG. 7, CB1, CB2, and CB3 represent combinations of different process parameters and operating parameter ranges, respectively. In this embodiment, the operating parameters range is an operating voltage range, an operating temperature range, or a combination thereof. As above-mentioned, those process parameters and operating parameters to be used can be inputted by the user at step 401.

As shown in FIG. 7, under the combination CB1, the cells which have the delay values within the predetermined range are C1, C2, C3, and C4. Also, under the combination CB2, the cells which have the delay values within the predetermined range are C2, C3, C4, C7 and C8. Further, under the combination CB3, the cells which have the delay values within the predetermined range are C1-C11. Therefore, the cells C2-C4 are cells having the delay values within a predetermined range under the combinations CB1-CB3, thus are called common cells. If the predetermined range is set to a smaller delay value, it means that the cell C2-C4 are better cells under the combination CB1-CB3, that is, the cells that are more recommended for the user. Oppositely, if the predetermined range is set to a larger delay value, it means that the cells C2-C4 are cells that are poor under combination CB1-CB3, that is, cells that are less recommended for the user. Through this mechanism, designers can easily find the cells they need.

Figure 8:
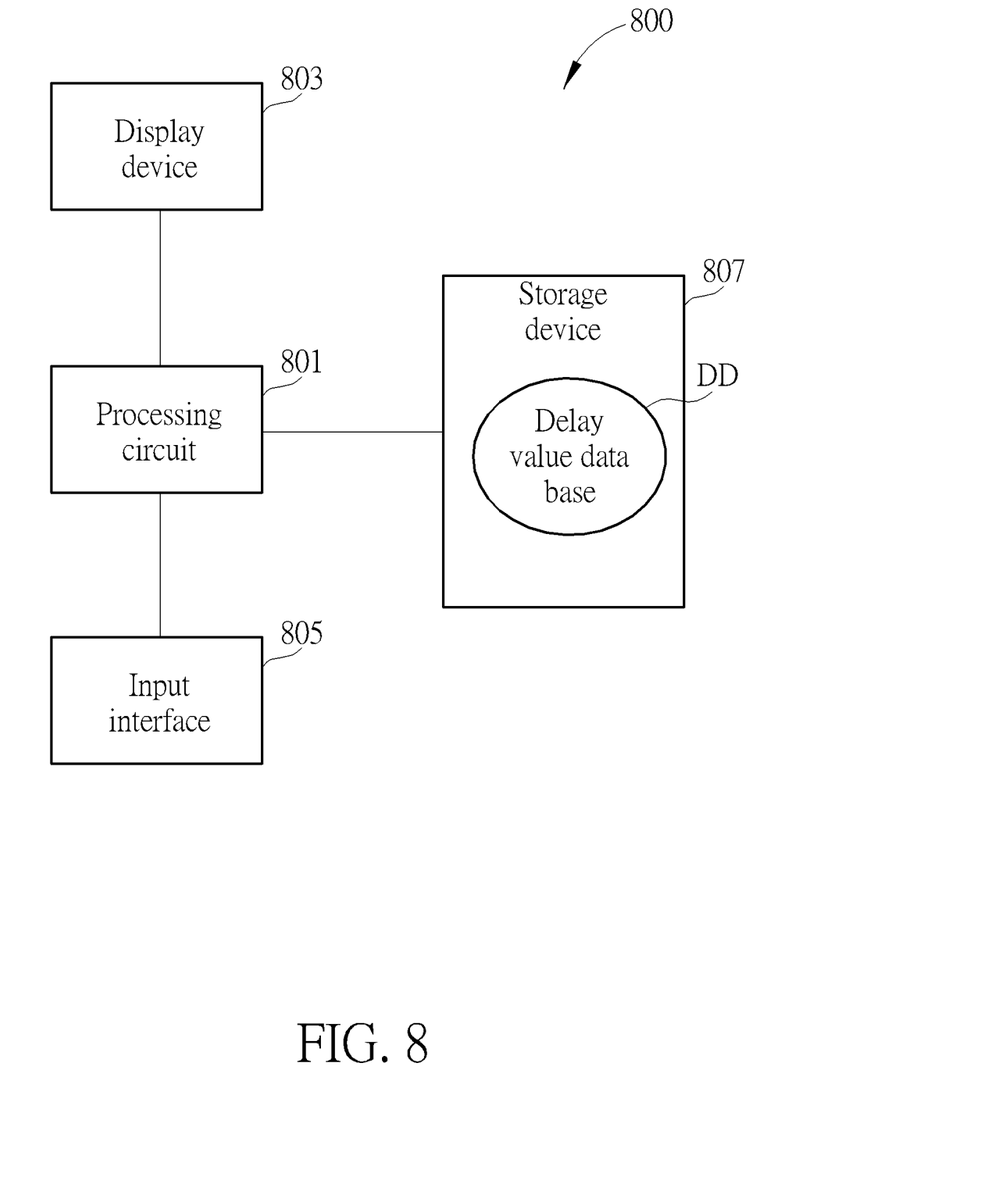
FIG. 8 is a block diagram illustrating an electronic device which can perform the IC design data base generating method and the IC design method according to one embodiment of the present invention.

FIG. 8 is a block diagram illustrating an electronic device which can perform the IC design data base generating method and the IC design method according to one embodiment of the present invention. As shown in FIG. 8, the electronic device 800 comprises a processing circuit 801, a display device 803, an input interface 805 (e.g. a keyboard, a mouse, a touch screen), and a storage device 807. The processing circuit 801 can generate the delay value database DD according to parameters inputted by the user at the input interface 805, such as the condition parameters or the operating parameter ranges in FIG. 2. The processing circuit 801 can also read the delay value database DD and filter the cells according to parameters inputted by the user at the input interface 805, such as the above-mentioned first or second filtering parameters. Also, the processing circuit 801 can control the display device 803 to display the cells. Please note, the present invention is not limited to being implemented by the electronic device of FIG. 8.

In view of above-mentioned embodiments, the present invention can generate a delay value database having cell delay value information in an operating parameter range, and an IC design method performed according to the delay value database. By this way, the conventional issue that a data base only contains cell delay value information corresponding to a single operating parameter thus the cell delay value in an operating parameter range must be measured after the IC has been produced can be improved. In addition, it should be understood that the steps of method mentioned in the present embodiment can be adjusted according to actual needs, and can be performed simultaneously or partially simultaneously, unless the order is specifically described.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An IC design method, comprising:
   (a) receiving a first filtering parameter of at least one cell; and
   (b) acquiring cell delay value information matching the first filtering parameter from a delay value data base according to the first filtering parameter, wherein the delay value data base comprises a plurality of delay values, wherein the plurality of delay values for an identical cell correspond to an operating parameter range with an identical type but different values;
   wherein the operating parameter range comprises at least one of following parameters: a loading parameter, an input slew rate, an operating frequency, a temperature and a voltage.

2. The IC design method of claim 1, the method further comprises:
   (c) displaying the at least one cell and related information of the delay values according to the cell delay value information.

3. The IC design method of claim 1, wherein the first filtering parameter comprises at least one of following parameters: a process parameter, the operating parameter range, a variation proportion of the delay values of the at least one cell in a range of the first filtering parameter, and a variation difference of the delay values of the at least one cell in the range of the first filtering parameter.

4. The IC design method of claim 2, wherein the step (c) further comprises: displaying a plurality of the variation proportions or a plurality of the variation differences of the delay values of the at least one cell in the range of the first filtering parameter.

5. The IC design method of claim 2, wherein the first filtering parameter comprises a process parameter and an operating parameter range, wherein the step (c) comprises:
   displaying the at least one cell with a delay value within a predetermined range under a combination of different ones of the process parameters and different ones of the operating parameter ranges.

6. The IC design method of claim 5, wherein the operating parameter range is an operating voltage range or an operating temperature range.

7. The IC design method of claim 1, the method further comprises:
   filtering all of the at least one cell matching the cell delay value information by a second filtering parameter to generate a filtering result.

8. The IC design method of claim 7, wherein the second filtering parameter comprises an average delay value of all the at least one cell plus N times of a standard deviation, wherein N is an integer or a non-integer.

9. An IC generated by an IC design method, the IC design method comprising:
   (a) receiving a first filtering parameter of at least one cell; and
   (b) acquiring cell delay value information matching the first filtering parameter from a delay value data base according to the first filtering parameter, wherein the plurality of delay values for an identical cell correspond to an operating parameter range with an identical type but different values;
   wherein the operating parameter range comprises at least one of following parameters: a loading parameter, an input slew rate, an operating frequency, a temperature and a voltage.

10. The IC of claim 9, wherein the IC design method further comprises:
    (c) displaying the at least one cell and related information of the delay values according to the cell delay value information.

11. The IC of claim 9, wherein the first filtering parameter comprises at least one of following parameters: a process parameter, the operating parameter range, a variation proportion of the delay values of the at least one cell in a range of the first filtering parameter, and a variation difference of the delay values of the at least one cell in the range of the first filtering parameter.

12. The IC of claim 10, wherein the step (c) further comprises:
    displaying a plurality of the variation proportions or a plurality of the variation differences of the delay values of the at least one cell in the range of the first filtering parameter.

13. The IC of claim 10, wherein the first filtering parameter comprises a process parameter and an operating parameter range, wherein the step (c) comprises:
    displaying the at least one cell with a delay value within a predetermined range under a combination of different ones of the process parameters and different ones of the operating parameter ranges.

14. The IC of claim 13, wherein the operating parameter range is an operating voltage range or an operating temperature range.

15. The IC of claim 9, the IC design method further comprising:
   filtering all of the at least one cell matching the cell delay value information by a second filtering parameter to generate a filtering result.

16. The IC of claim 15, wherein the second filtering parameter comprises an average delay value of all the at least one cell plus N time of a standard deviation, wherein N is an integer or a non-integer.

* * * * *